(12) United States Patent
Corbett et al.

(10) Patent No.: US 6,241,438 B1
(45) Date of Patent: Jun. 5, 2001

(54) SYSTEM FOR STACKING OF CHASSIS

(75) Inventors: Nelson H. Corbett; Douglas C. Corbett, both of Portland, OR (US)

(73) Assignee: Chassis Systems, Inc., Portland, OR (US)

( * ) Notice: Subject to any disclaimer, the term of this patent is extended or adjusted under 35 U.S.C. 154(b) by 0 days.

(21) Appl. No.: 09/397,454

(22) Filed: Sep. 16, 1999

(51) Int. Cl.⁷ .................................................. B60P 3/06
(52) U.S. Cl. ................................... 410/56; 410/30
(58) Field of Search ................................. 410/56, 57, 65, 410/30; 188/32; 248/146, 154

(56) References Cited

U.S. PATENT DOCUMENTS

| | | |
|---|---|---|
| 2,827,302 | 3/1958 | Skyrud . |
| 2,992,621 * | 7/1961 | Schoen . |
| 3,767,255 | 10/1973 | Bertolini . |
| 4,312,452 * | 1/1982 | Waier . |
| 4,611,962 | 9/1986 | Braly et al. . |
| 4,650,381 | 3/1987 | Durkin . |
| 4,752,167 * | 6/1988 | G'Geppert . |
| 4,836,337 * | 6/1989 | Borrelli . |
| 4,952,118 | 8/1990 | Macmillan . |
| 4,986,705 | 1/1991 | Durkin . |
| 5,183,375 | 2/1993 | Fenton et al. . |
| 5,934,695 * | 8/1999 | Rowland . |

* cited by examiner

Primary Examiner—D. Glenn Dayoan
Assistant Examiner—Scott Carpenter
(74) Attorney, Agent, or Firm—Klarquist Sparkman Campbell Leigh & Whinston, LLP

(57) ABSTRACT

A support for assisting in stacking multiple trailer chassis one atop the other. Each chassis has an elongate frame and wheels supporting its rear end. A support, or supports, support the wheels of an overlying trailer chassis above and out of engagement with the ground-engaging wheels of the lowermost chassis in the stack to permit rolling movement of the stack.

6 Claims, 4 Drawing Sheets

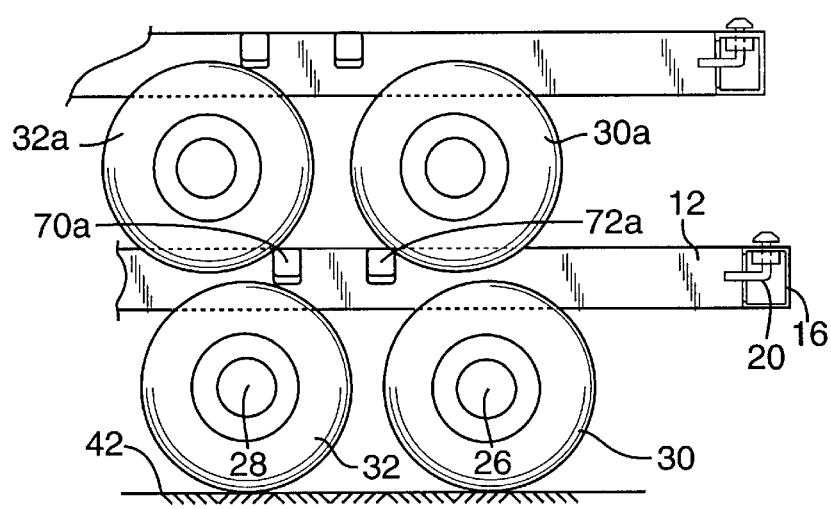

SYSTEM FOR STACKING OF CHASSIS

BACKGROUND OF THE INVENTION

This invention relates to the storage of wheeled trailer frames, or chassis, of the type used to haul cargo containers. More specifically it relates to the storage of such trailer frames in a vertically-stacked relationship, such that the ground-engaging wheels of the lowest trailer frame in the stack may turn freely to permit towing of the stack.

Wheeled trailer frames, also referred to as chassis, often are stored at shipping or rail-loading sites in large quantities. Due to their size they occupy a large amount of space if merely parked in horizontally-disposed condition adjacent each other on the ground.

Efforts have been made to save ground space by storing such chassis in tilted-up arrangement in support frames. Other attempts have been made to save space by stacking the trailer frames, or chassis, one atop the other.

In the tilted-up, or vertical storage, specialized storage frames and tilting equipment are required. In prior stacking arrangements one trailer frame is stacked atop the other with the wheels of each chassis interlocking, or engaging, the wheels of the chassis therebelow. With the wheels thus locked the stack may not be repositioned easily by tractor towing.

In the past efforts have been made to overcome this wheel-lock problem by providing rather complex support frames mounted on the lower-most frame to support overlying chassis. In other instances attempts have been made to overcome this problem by inverting the chassis laid atop the lower-most ground engaging chassis, such that the inverted chassis wheels do not engage and interlock with the wheels on the lowermost chassis. Although this has allowed the wheels of the ground-engaging chassis to rotate to permit tractor-towed moving of the stack, it has required specialized equipment to invert the overlying chassis and results in added work time. Further, chassis stacked in this fashion may not be safely transportable because the inverted chassis may slide on the ground engaging rolling chassis.

SUMMARY OF THE INVENTION

It is an object of the present invention to provide a system for stacking multiple generally horizontally disposed trailer frames, or chassis, one above the other, such that the ground-engaging wheels of the lower-most chassis in the stack are free to turn, thus allowing the entire stack to be repositioned by tractor towing.

Another object of the invention is to provide such a system for permitting free turning of the wheels of the lower most chassis through a system which encompasses only a minor portion of the length of the frame of the lower most chassis, as opposed to prior devices which have included rather complex support frames extending substantially the full length of the chassis.

A further object is to provide sufficient restraint such that a stacked chassis will not shift relative to the rolling chassis during transport.

These and other objects and advantages will become more fully apparent as the following description is read in conjunction with the drawings.

BRIEF DESCRIPTION OF THE DRAWINGS

FIG. 8 is a perspective view of the rear end of a trailer frame having cantilevered wheel supports extending outwardly from the trailer frame to assist in supporting overlying chassis in a stacked arrangement;

FIG. 9 is a side-elevation view of a system similar to that illustrated in FIG. 8 with an overlying chassis supported on the cantilevered supports;

FIG. 10 is a side elevation view somewhat similar to FIG. 9, with a cantilevered support for the overlying truck frame, positioned differently.

DESCRIPTION OF PREFERRED EMBODIMENTS

Figure 1:
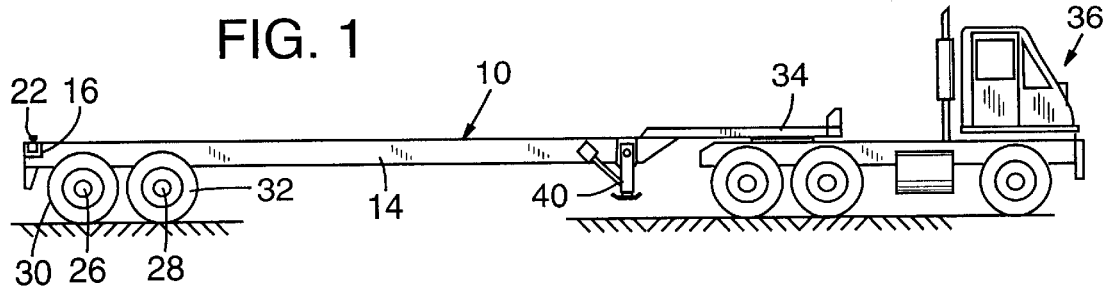
FIG. 1 is a side elevation view of a trailer frame, or chassis, of the type used to haul cargo containers attached to a truck tractor.
Figure 7:
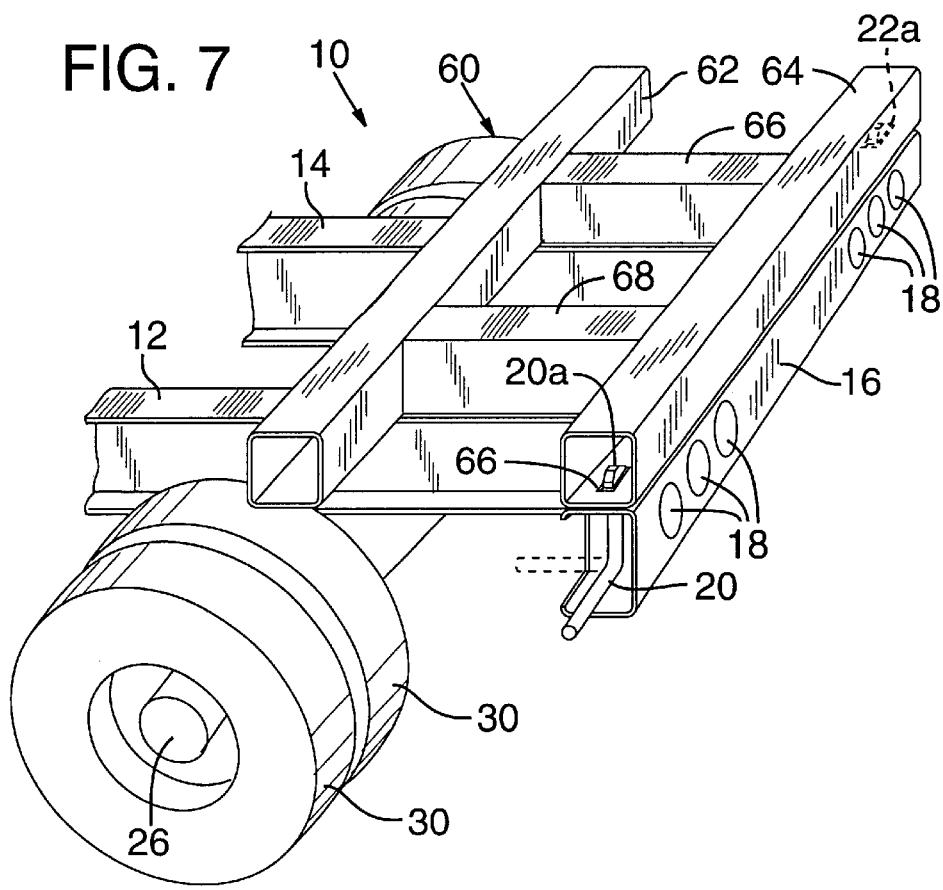
FIG. 7 is a perspective view of a second embodiment of a support mounted on the frame of a chassis for assisting in stacking chassis.

Referring first to FIG. 1, at 10 is indicated generally a trailer frame, or chassis, adapted to haul cargo containers. The trailer frame includes an elongate, substantially parallel, pair of laterally spaced, longitudinally extending frame rails, or members, 12, 14, the rear ends of which are shown in FIGS. 7 and 8.

Laterally extending cross members are secured between rails 12, 14 to maintain them in their selected spaced relationship. One cross member, or beam, 16 extends transversely of the rear end of the frame and is secured to the rear ends of rails 12, 14. As is seen in FIGS. 7 and 8 crossmember 16 as viewed in end section is a substantially rectangular box beam. This beam also supports a plurality of lights shown schematically at 18.

As best seen in FIG. 8, twist lock devices 20, 22 are provided on beam 16. These twist locks are well known in the industry, and thus will be described only generally here. They include a somewhat arrow-head shaped gripping head portion 20a, 22a projecting above the top of beam 16 and an L-shaped handle 20b housed partially within the beam. As is known in the art, a container or other device to be secured to the frame is set thereon with a receiving aperture in the container aligned with head 20a, 22a. The operator need merely rotate the twist lock device 90° about its vertical axis from the position illustrated in solid outline at 20b to the dashed illustrated at 20c and the arrow-shaped heads 20a, 22a interlock with the item to be connected to the chassis.

Referring again to FIG. 1 the rear end of frame 10 is supported on dual axles 26, 28 spaced apart longitudinally of the frame and mount sets of wheels 30, 32 respectively. As is shown in FIGS. 7 and 8 each axle may support dual wheels at opposite sides of the frame. Further it will be seen that the wheels are spaced a selected distance laterally outwardly from opposite side of frame rails 12, 14 and below the tops of the frame rails.

An elongate connecting tongue 34 allows the trailer frame to be connected to a towing connection on a towing tractor indicated generally at 36. Secured adjacent the forward end of trailer frame 10 are a pair of laterally spaced jack stands 40, only one of which is visible in FIG. 1. A similar jack stand is secured to the opposite side of the frame also. These jack stands are used for supporting the forward end of the trailer frame when it is disconnected from its towing tractor 36. Such is shown at FIG. 2 where the lower most trailer frame is shown supported on a support surface 42 at its rear end by wheels 30, 32 and its forward end by jack stands 40.

An elongate, transverse, horizontally disposed support member (not shown) is secured to and extends between opposed jack stands 40 at opposite sides of the frame. The cross member extending between opposed jack stands 40 supports the forward ends of overlying trailer frames in substantially horizontal positions as illustrated in FIG. 2.

When a trailer frame is connected to a tractor as illustrated in FIG. 1, it is easily moved by the towing tractor since the wheels are free to rotate. A cargo container, or other load may be mounted on the trailer frame, and if appropriately structured, may be connected thereto by twist locks 20, 22.

Figure 2:
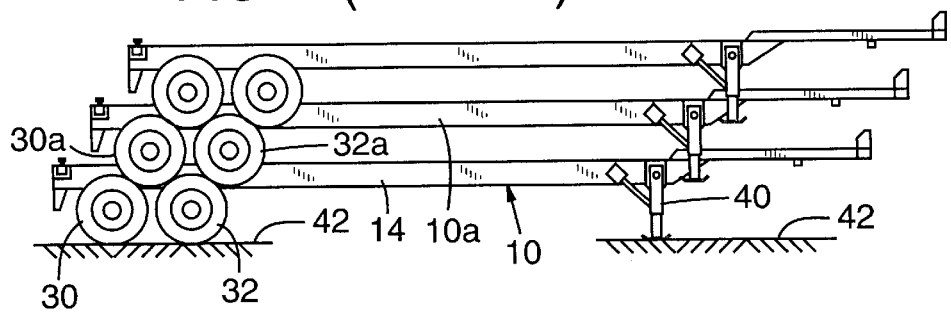
FIG. 2 is an illustration of prior art stacking of horizontally disposed trailer frames.

When it comes time to store the trailer frames they often have been stacked as illustrated in FIG. 2. In this stacked condition the wheels 30a, 32a of the second, or overlying, frame 10a engage and interlock with the ground engaging wheels 30, 32 of the first, or lowermost, frame 10. With the wheels of an overlying trailer frame thus engaging and interlocking with the wheels on the lowermost frame, the wheels on the lowermost frame are substantially locked against rotation, and the stack of frames is substantially prevented from being moved by a towing tractor.

Figure 3:
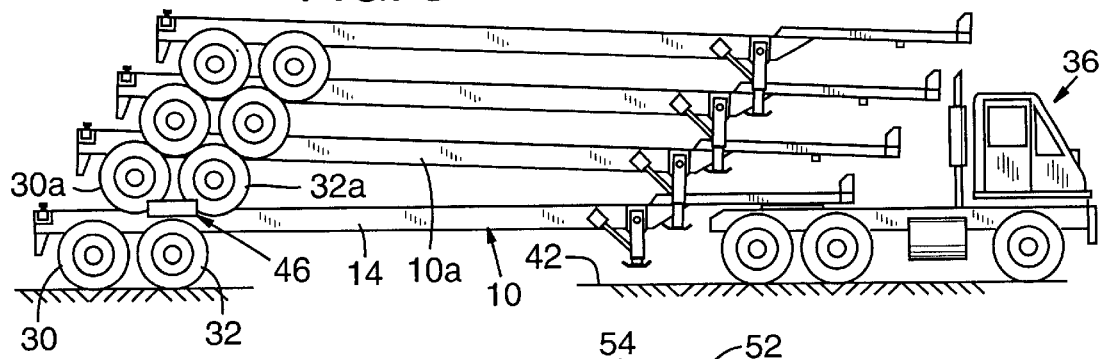
FIG. 3 is a side elevation schematic illustration of the present invention in which multiple horizontally disposed trailer frames are stacked atop a ground-engaging trailer frame, the wheels of which are free to roll to be towed by a truck tractor.

A solution to this problem as set out herein is illustrated for one embodiment in FIG. 3. In FIG. 3 a support indicated generally at 46 is mounted on and occupies only a small section of the rear portion of frame 10. Support 46 is adapted to support wheels 30a, 32a of frame 10a above and out of engagement with wheels 30, 32 of frame 10. In this condition wheels 30, 32 are free to rotate. The stack may be connected to tractor 36, the air brakes of the ground-engaging chassis released, and the stack easily towed for movement.

Figure 4:
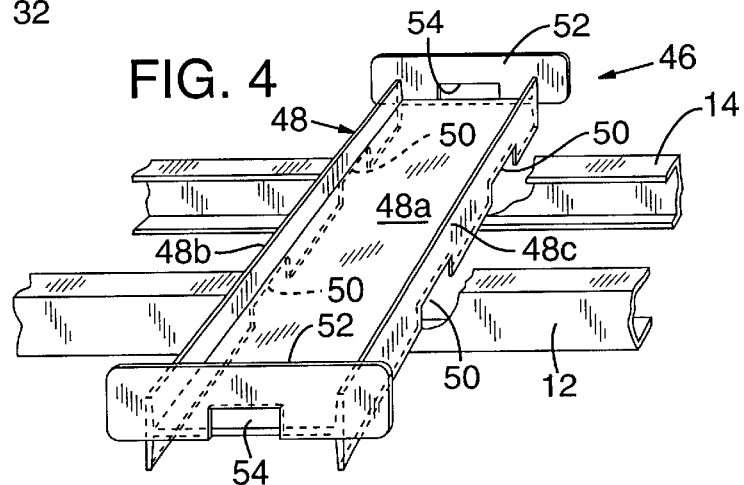
FIG. 4 is an enlarged perspective view of a support for assisting in stacking trailer frames, or chassis, according to the present invention.

Referring to FIG. 4, support 46 is illustrated in greater detail. Support 46 includes an elongate I-beam 48 disposed with a central web 48a substantially horizontal and its opposed flanges 48b, 48c extending vertically. Notches 50 are cut in the lowermost portions of flanges 48b, 48c to fit over the tops of frame rails 12, 14. With the support 46 resting on the tops of frame rails 12, 14 as illustrated in FIG. 4 opposite end portions of beam 48 extend laterally outwardly from opposite sides of the frame rails and the support is held in position against lateral movement by engagement of the edge margins of the notches 50 against the sides of the frame rails.

Upright plates 52 are secured, as by welding, to opposite ends of beam 48 and act as restraining elements as will be described hereafter. Notches 54 are cut out of end plates 52 to provide a means for lifting devices to connect to the support to lift it on to and off of the frame rails.

Figure 5:
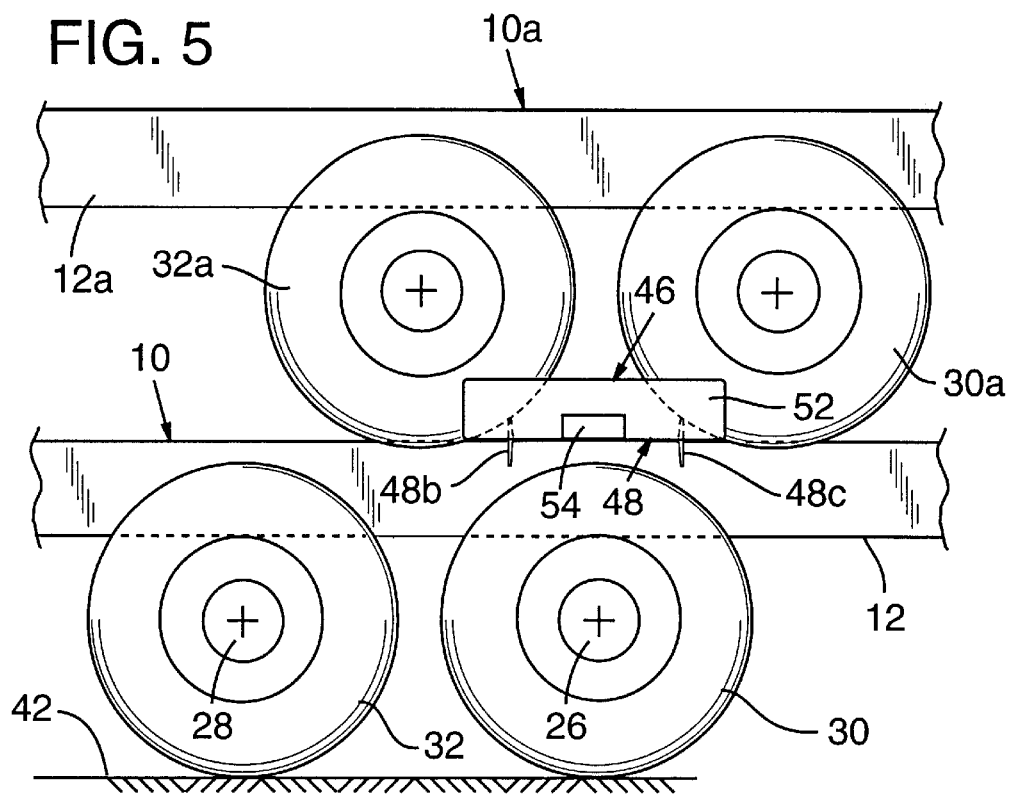
FIGS. 5 and 6 are enlarged side elevation views of portions of stacked trailer frames in which the wheels of the overlying frame are supported on a support as shown in FIG. 4.
Figure 6:
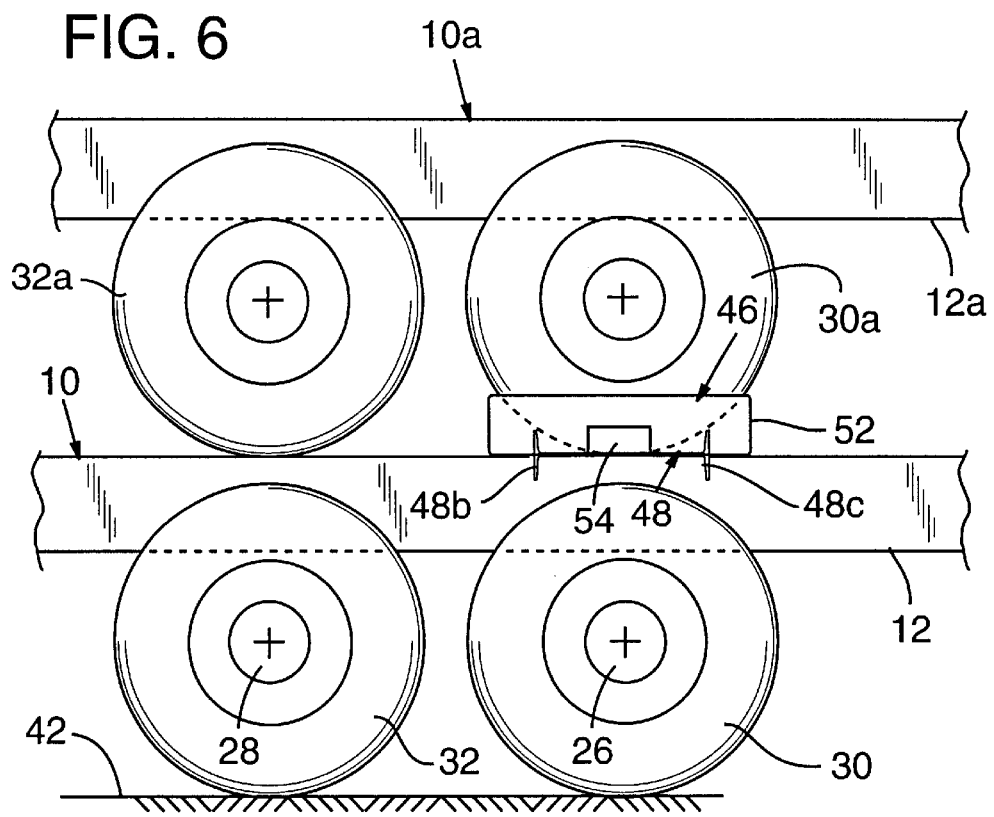

Use of support 46 is best illustrated in FIGS. 5 and 6. It will be seen that with the support resting on the frame rails the support is above wheels 30, 32 of the lowermost trailer frame 10 in the stack. An overlying frame 10a may be supported thereabove with either both of its sets of wheels 30a, 32a supported on and restrained against movement by the upright flanges 48b, 48c of the support (see FIG. 5), or (as shown in FIG. 6) only one of the support wheels of frame 10a may rest in the support 46, with the upright flanges 48b, 48c of the beam of support 46 acting as stop elements to inhibit movement of the overlying frame relative to the lower most frame. The lower portions of wheels 30a, 32a have what may be referred to as fore regions (toward the forward end of the frame) and aft regions (toward the rear of the frame). As seen is FIG. 5 flange 48b engages an aft region of wheel 32a, and flange 48c engages a fore region of wheel 30a. The flanges thus act as stop elements to restrain the overlying frame and wheels against fore and aft movement relative to the lowermost frame. Further, wheels 30a, 32a are supported between opposed plates 52, which act to restrain side-to-side shifting of the overlying frame relative to the lowermost frame.

Figure 7A:
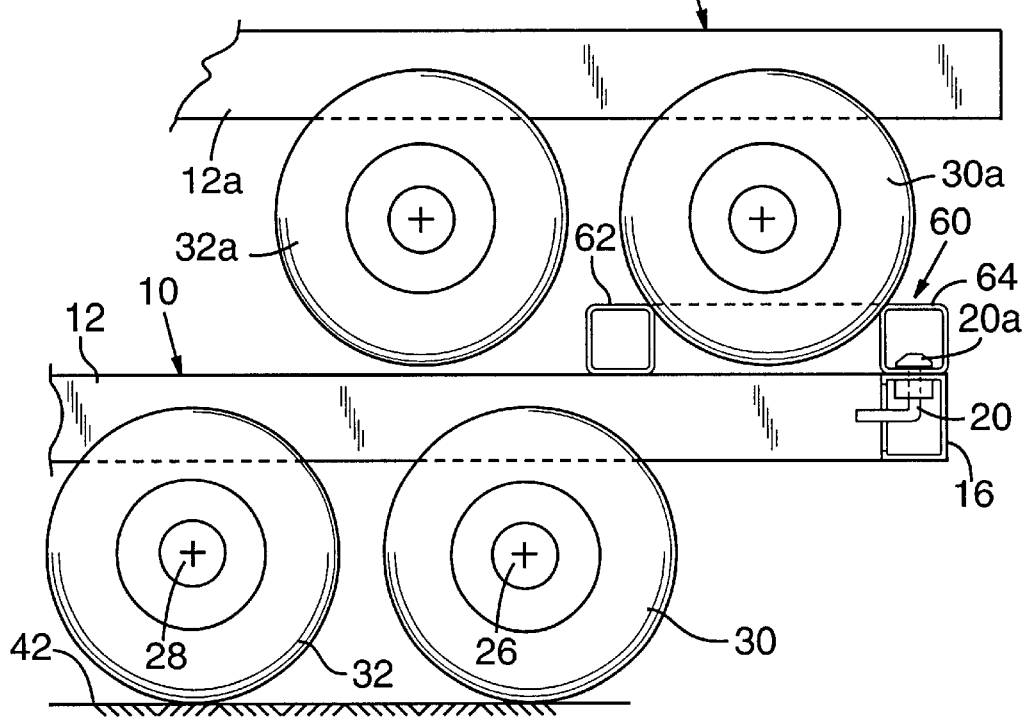
FIG. 7A is a side elevation view of the system illustrated in FIG. 7 with an overlying chassis supported thereon.

Referring to FIGS. 7 and 7a, another embodiment of the support is indicated generally at 60. This support comprises a pair of elongate, substantially, parallel, laterally spaced box beams, or support elements, 62, 64. A pair of cross members 66, 68 extend between, and are secured, as by welding, to beams 62, 64 to maintain a selected spaced relationship therebetween. As illustrated in FIG. 7, the lower portion of box beam 64 has apertures, such as that indicated at 66, formed therein adjacent each of its ends. These apertures 66 are adapted to receive the locking heads 20a, 22a of twist locks 20, 22. Upon swiveling of the twist locks, their locking heads 20a, 22a serve to lock, or secure, support 60 to frame 10. However, it may not be necessary to rotate, or swivel, the twist locks. The apertures 66 fitting over, or in registry with the twist locks may be sufficient to restrain the support.

As is seen in FIG. 7, opposite ends of beams 62, 64 extend laterally outwardly beyond the outer sides of frame rails 12, 14. As shown in FIG. 7a, the box beams 62, 64 are adapted to support at least one set of the rear wheels of overlying frame 10a, such that the wheels of the overlying frame are above and out of engagement with the ground engaging wheels of the lower most frame 10.

A further embodiment is illustrated in FIG. 8. Here, rather than having a separable support, a plurality of elongate support elements, or members, 70, 72 are secured to and project laterally outwardly from outer sides of frame rails 12, 14. The support elements, or members, are secured, as by welding, to the frame rails and are cantilevered laterally outwardly therefrom above wheels 30, 32 of frame 10.

As shown in FIG. 8, the support elements 70, 72 are spaced fore and aft, respectively, of wheel 30. However, as illustrated in FIG. 9 such support elements, or members might also be secured in spaced relation in the space above the separation between wheels 30, 32, as illustrated for supports 70a and 72a.

In FIG. 10 a different arrangement is illustrated using a single cantilevered support element, or member 70b at opposite sides of frame rails 12, 14. This element is spaced rearwardly of wheels 30 and nearer to cross member 16.

In use, all of the cantilevered support elements, or members, 70, 72, 70a, 72a, and 70b function substantially similarly. As illustrated in FIG. 9 when a trailer frame 10a is stacked above trailer frame 10 the wheels 30a, 32a are supported on support elements 70, 72 or 70a, 72a above and out of engagement with wheels 30, 32 of frame 10. Where only a single cantilevered element 70b is used, as illustrated in FIG. 10, wheels 30a, 32a rest on and are supported by member 70b and crossbeam 16. Again wheels 30a, 32a of the overlying trailer frame are supported above and out of engagement with the ground-engaging wheels 30, 32 of frame 10, such that the lowermost frame may be moved with a stack of trailer frames supported thereon by a towing tractor.

While preferred embodiments have been described herein, it should be apparent to those skilled in the art that variations and modifications are possible without departing from the spirit of the invention as set out in the following claims.

We claim:

1. A support for assisting in stacking multiple trailer chassis one atop the other, wherein each chassis has an elongate frame the rear end of which is supported by wheels connected to the frame, and the chassis are stacked with the wheels of a second chassis overlying the wheels of a first chassis which is the lowest chassis in the stack, whereby the wheels on the first chassis engage the ground and are free to rotate to permit moving of the stack by towing of the first chassis, the support comprising a support element mountable on the frame of the first chassis, encompassing only a minor portion of the length of the frame of the first chassis, and being operable to support the wheels of the second chassis above and out of engagement with the wheels of the first chassis, said support element comprising an elongate member having a web section and stop elements projecting outwardly therefrom, said member being mountable in a position extending laterally of the frame of the first chassis, with its web section substantially horizontal and said stop elements extending upwardly therefrom to engage a wheel of said second chassis, and further having downwardly extending projections positioned to engage the frame of the first chassis to maintain the member in a selected position relative to the first chassis frame.

2. The support of claim 1, which further comprises restraining elements secured to said member and projecting upwardly therefrom to engage at least one wheel of said second chassis and restrain it against lateral movement.

3. The support of claim 1, wherein said support element is removable from said chassis frame and further comprises a lifting element which may be engaged by a lifting device to aid in removing said support element from said chassis frame.

4. The support of claim 1, wherein said downwardly extending projections comprise flanges on said member which have portions removed to produce notches having opposed side margins, which notches fit over the frame of said first chassis with said side margins positioned to engage the frame.

5. The support of claim 4, wherein end plates are secured adjacent opposite ends of said elongate member and project upwardly therefrom to engage opposed wheels on the second chassis to restrain the second chassis against movement laterally of the first chassis.

6. A support for assisting in stacking multiple trailer chassis one atop the other, wherein each chassis has an elongate frame the rear end of which is supported by wheels connected to the frame, with the wheels of the second chassis having fore and aft regions and the chassis are stacked with the wheels of a second chassis overlying the wheels of a first chassis which is the lowest chassis in the stack, whereby the wheels on the first chassis engage the ground and are free to rotate to permit moving of the stack by towing of the first chassis, the support comprising a support element mountable on the frame of the first chassis, encompassing only a minor portion of the length of the frame of the first chassis, and being operable to support the wheels of the second chassis above and out of engagement with the wheels of the first chassis, the support element comprising an elongate member having a web section and stop elements projecting outwardly therefrom which define support portions, said member being mountable in a position extending laterally of the frame of the first chassis, with its web section substantially horizontal and said stop elements extending upwardly therefrom and laterally of the frame of the first chassis and spaced apart a selected distance longitudinally of the first frame which distance is sufficient to engage and support fore and aft regions of the wheels of the second chassis at a selected elevation above the wheels of the first chassis, and further having downwardly extending projections positioned to engage the frame of the first chassis to maintain the member in a selected position relative to the first chassis frame.

* * * * *